US009535520B2

(12) United States Patent
Park et al.

(10) Patent No.: US 9,535,520 B2
(45) Date of Patent: Jan. 3, 2017

(54) ELECTRONIC DEVICE AND METHOD FOR PROCESSING HOVERING INPUT THEREOF

(71) Applicant: Samsung Electronics Co., Ltd., Gyeonggi-do (KR)

(72) Inventors: Soonsang Park, Daegu (KR); Jongwu Baek, Gyeongsangbuk-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 14/531,294

(22) Filed: Nov. 3, 2014

(65) Prior Publication Data

US 2015/0123920 A1    May 7, 2015

(30) Foreign Application Priority Data

Nov. 1, 2013  (KR) .................. 10-2013-0132192

(51) Int. Cl.
*G06F 3/0488* (2013.01)
*G06F 3/041* (2006.01)

(52) U.S. Cl.
CPC ............. *G06F 3/041* (2013.01); *G06F 3/0418* (2013.01); *G06F 2203/04108* (2013.01)

(58) Field of Classification Search
CPC .............................. G06F 3/0421; G06F 3/0488
See application file for complete search history.

(56) References Cited

U.S. PATENT DOCUMENTS

| | | | | |
|---|---|---|---|---|
| 2008/0158185 A1* | 7/2008 | Westerman | ........... | G06F 3/0488 345/173 |
| 2012/0050180 A1* | 3/2012 | King | .................... | G06F 3/0416 345/173 |
| 2012/0075212 A1 | 3/2012 | Park et al. | | |
| 2012/0262407 A1* | 10/2012 | Hinckley | ................ | G06F 3/038 345/173 |
| 2014/0028628 A1* | 1/2014 | Hildreth | .................. | G06F 3/017 345/175 |
| 2014/0143698 A1* | 5/2014 | Kim | ..................... | G06F 3/04817 715/768 |
| 2014/0176477 A1* | 6/2014 | Nakao | ................... | G06F 3/0416 345/173 |
| 2014/0192023 A1* | 7/2014 | Hoffman | ............... | G06F 3/0423 345/175 |
| 2014/0354589 A1* | 12/2014 | Ahn | ....................... | G06F 3/044 345/174 |

(Continued)

FOREIGN PATENT DOCUMENTS

KR    10-2012-0031806    4/2012

*Primary Examiner* — Ricardo L Osorio (74) *Attorney, Agent, or Firm* — The Farrell Law Firm, P.C.

(57) ABSTRACT

An electronic device and a method for processing a hovering input are provided. The method includes displaying a screen; when a hovering input is sensed, detecting a location of the sensed hovering input; analyzing a priority of the hovering input; and determining a position of a hovering pointer from the location of the hovering input having the highest priority. The electronic device includes a touch screen configured to display thereon a screen and to touch sense a hovering input; and a control unit configured, when the hovering input is sensed from the screen, to detect a location of the sensed hovering input, to analyze a priority of the hovering input, and to determine a position of a hovering pointer from the location of the hovering input having a highest priority.

15 Claims, 6 Drawing Sheets

(56) References Cited

U.S. PATENT DOCUMENTS

2015/0116344 A1\* 4/2015 Won .................. G09G 3/32
                                                    345/589
2016/0103830 A1\* 4/2016 Cheong ............. G06F 3/0488
                                                    715/738

\* cited by examiner

ELECTRONIC DEVICE AND METHOD FOR PROCESSING HOVERING INPUT THEREOF

PRIORITY

This application claims priority under 35 U.S.C. §119(a) to a Korean Patent Application filed on Nov. 1, 2013 in the Korean Intellectual Property Office and assigned Serial No. 10-2013-0132192, the entire contents of which are incorporated herein by reference.

BACKGROUND

1. Field of the Invention

The present invention relates to an electronic device and method for processing a hovering input thereof, and more particularly, to an electronic device and method for processing a hovering by determine a priority of a hovering input.

2. Description of the Related Art

Recently, some electronic devices have employed a touch panel of a proximity touch type which recognizes the approach of a nearby object in a non-contact manner without touching the screen. This non-contact, or proximity touch, technique is normally based on a hovering input entered by a certain input tool (e.g., a user's finger, an electronic pen, etc.). In response to a hovering input, an electronic device visually offers a pointer on the screen and performs a particular function such as selecting, executing, or previewing an object which is displayed on the screen and indicated by the pointer.

Unfortunately, this electronic device may often sense two or more hovering inputs due to, for example, a user's hand or fingers gripping it. Such simultaneous sensing of hovering inputs may cause a pointer to be displayed at an undesired position on the screen. Therefore, a user may often have trouble selecting a desired object displayed on the screen.

SUMMARY

The present invention has been made to address the above-mentioned problems and disadvantages, and to provide at least the advantages described below. Accordingly, an aspect of the present invention provides a method and an electronic device for enhancing the accuracy of a hovering input.

In accordance with an aspect of the present invention, a method of processing an input of an electronic device is provided. The method includes displaying a screen; when a hovering input is sensed, detecting a location of the sensed hovering input; analyzing a priority of the hovering input; and determining a position of a hovering pointer from the location of the hovering input having the highest priority.

In accordance with another aspect of the present invention, an electronic device is provided. The electronic device includes a touch screen configured to display thereon a screen and to touch sense a hovering input; and a control unit configured, when the hovering input is sensed from the screen, to detect a location of the sensed hovering input, to analyze a priority of the hovering input, and to determine a position of a hovering pointer from the location of the hovering input having the highest priority.

BRIEF DESCRIPTION OF THE DRAWINGS

The foregoing and other aspects, features, and advantages of the present invention will be more apparent from the following description, taken in conjunction with the accompanying drawings, in which.

DETAILED DESCRIPTION OF EMBODIMENTS OF THE PRESENT INVENTION

The following description with reference to the accompanying drawings is provided to assist in a comprehensive understanding of various embodiments of the present invention as defined by the claims and their equivalents. It includes various details to assist in that understanding but these are to be regarded as merely exemplary. Accordingly, those of ordinary skill in the art will recognize that various changes and modifications of the embodiments described herein can be made without departing from the scope and spirit of the present invention. In addition, descriptions of well-known functions and constructions are omitted for clarity and conciseness.

The terms and words used in the following description and claims are not limited to their dictionary meanings, but, are merely used to enable a clear and consistent understanding of the present invention. Accordingly, it should be apparent to those skilled in the art that the following description of various embodiments of the present invention is provided for illustration purpose only and not for the purpose of limiting the present invention as defined by the appended claims and their equivalents.

It is to be understood that the singular forms "a," "an," and "the" include plural referents unless the context clearly dictates otherwise. Thus, for example, reference to "a signal" includes reference to one or more of such signals.

In the present invention, a touch panel may include a sensing region and a bezel region therein. The sensing region refers to an area on which a screen (containing at least one object) is displayed, and the bezel region refers to an area on which such a screen is not displayed. In other words, the bezel region refers to a part that forms the outer edge of an electronic device.

Additionally, a boundary, one of the terms used in the present disclosure, refers to a border between the bezel region and the sensing region. In various embodiments of the present invention, a gesture passing through the boundary, i.e., a gesture that travels from the bezel region to the sensing region, may be recognized as a moving path of a specific hovering input.

In the present invention, when an electronic device senses two or more hovering inputs, priority is used as a criterion for determining a position of a hovering pointer from one of the sensed hovering inputs. Namely, from a specific hovering input having the highest priority among the sensed hovering inputs, the electronic device determines a coordinate value of a hovering pointer to be displayed on the screen.

In an embodiment of the present invention, a hovering input which starts from a specific location (e.g., a hovering input sensed directly at the sensing region of the touch panel) is defined as a hovering input having the first priority. Additionally, a hovering input which is entered along a specific route (e.g., a hovering input sensed as a moving path from the bezel region of the touch panel to the sensing region) is defined as a hovering input having the second priority. Further, a hovering input from which no moving speed is sensed (e.g., a hovering input occurring at the boundary of the touch panel by a user's grip) is defined as a hovering input having the third priority.

In an embodiment of the present invention, a moving path is used as a criterion for determining the priority of a hovering input. Specifically, such a priority may be determined by analyzing whether a moving path from the bezel region to the sensing region is sensed or not, namely whether a hovering input is sensed as passing through the boundary or sensed directly at the sensing region of the touch panel. In an embodiment of the present invention, a moving speed is used as a criterion for determining the validity of a hovering input. Specifically, if a moving speed (i.e., movement) is sensed from a hovering input, this hovering input is determined to be valid. In contrast, if no moving speed is sensed from a hovering input, this hovering input is determined to be invalid.

An electronic device disclosed herein may be one of various touch-sensitive devices such as a mobile phone, a smart phone, a tablet Personal Computer (PC), a hand-held PC, a Portable Multimedia Player (PMP), a Personal Digital Assistant (PDA), a notebook PC, a laptop computer, and the like.

Figure 1:
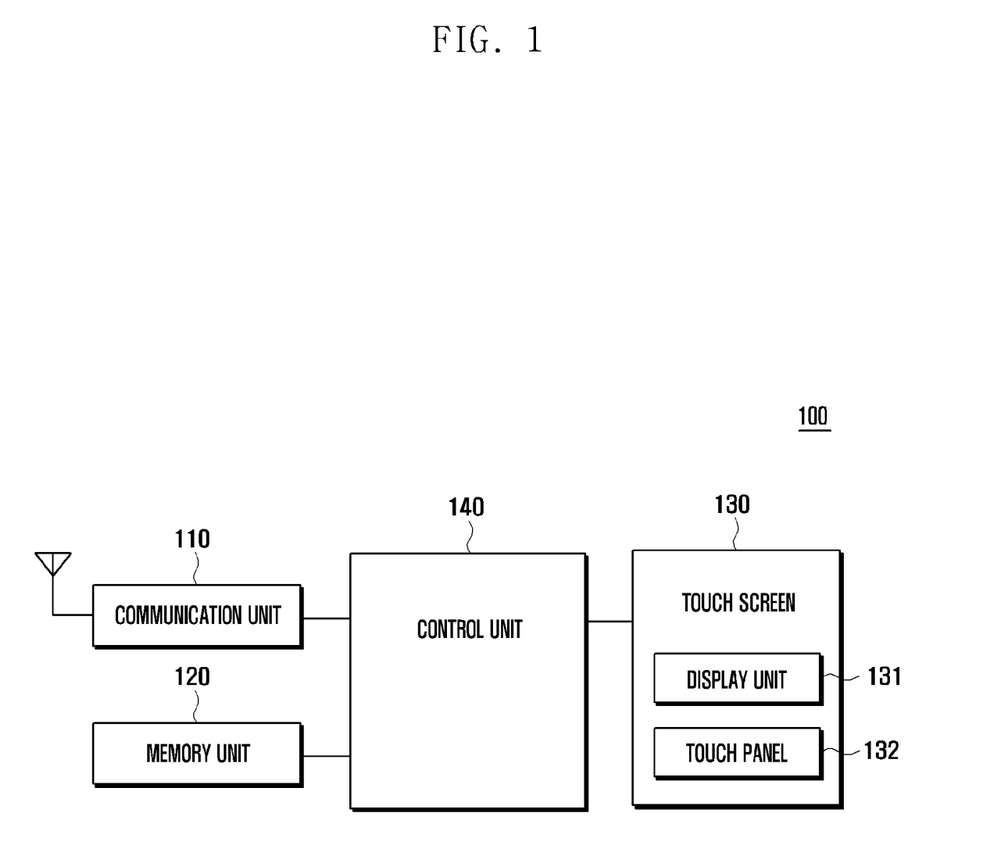
FIG. 1 is a block diagram of an electronic device in accordance with an embodiment of the present invention.

FIG. 1 is a block diagram of an electronic device 100 in accordance with an embodiment of the present invention.

Referring to FIG. 1, the electronic device 100 may include, but is not limited to, a communication unit 110, a memory unit 120, a touch screen 130, and a control unit 140.

The communication unit 110 is configured to perform a voice call, a video call, or a data communication with any external device through a network. The communication unit 110 includes a Radio Frequency (RF) transmitter that up-converts the frequency of an outgoing signal and then amplifies the signal, an RF receiver that amplifies with low-noise an incoming signal and down-converts the frequency of the signal, and the like. Also, the communication unit 110 may include a modulator and a demodulator (e.g. a modem), which are adapted to Code Division Multiple Access (CDMA), Wideband CDMA (WCDMA), Long Term Evolution (LTE), Wireless Fidelity (WiFi), Wireless Broadband (WiBro) internet, Bluetooth, Near Field Communication (NFC), and the like. The communication unit 110 may include a mobile communication module, an internet communication module, and/or a short-range communication module.

The memory unit 120 includes a program memory for storing therein an operating program of the electronic device 100, and a data memory for storing therein data created during the execution of such a program.

The touch screen 130 includes a display unit 131 and a touch panel 132. The display unit 131 displays thereon a variety of screens associated with the operation of the electronic device 100 under the control of the control unit 140. The display unit 131 may be a Liquid Crystal Display (LCD), Organic Light Emitting Diode (OLED), Active Matrix OLED (AMOLED), or the like. The touch panel 132 may have an integrated form of a finger touch panel for sensing a finger gesture and a pen touch panel for sensing a pen gesture.

In an embodiment of the present invention, the touch panel 132 senses a hovering input over the screen of the display unit 131 and delivers a sensing signal to the control unit 140. Then, under the control of the control unit 140, the display unit 131 displays a hovering pointer at a specific location from which the hovering input is sensed.

The control unit 140 controls an overall operation of the electronic device 100 and a signal flow between internal elements of the electronic device 100. Additionally, the control unit 140 performs a data processing function and controls power supplied from a battery to such elements.

Particularly, in an embodiment of the present invention, if a hovering input is sensed from the screen of the display unit 131 via the touch panel 132, the control unit 140 is configured to determine whether the sensed hovering input is a valid hovering input. If so, the control unit 140 is configured to detect a coordinate value of the hovering input. If the detected coordinate value is a single value, the control unit 140 is configured to directly determine the position of a hovering pointer from the detected coordinate value. In contrast, if the detected coordinate value has two or more values, the control unit 140 is configured to determine priorities by analyzing a moving path of each hovering input and then determine the position of a hovering pointer from the location (i.e., the coordinate value) of a specific hovering input having the highest priority.

Although not illustrated in the drawings, the electronic device 100 may further essentially or optionally have another element such as a Global Positioning System (GPS) module, an audio processing unit having a microphone and a speaker, an input unit for supporting an input mechanism based on a hard key, and the like.

Figure 2:
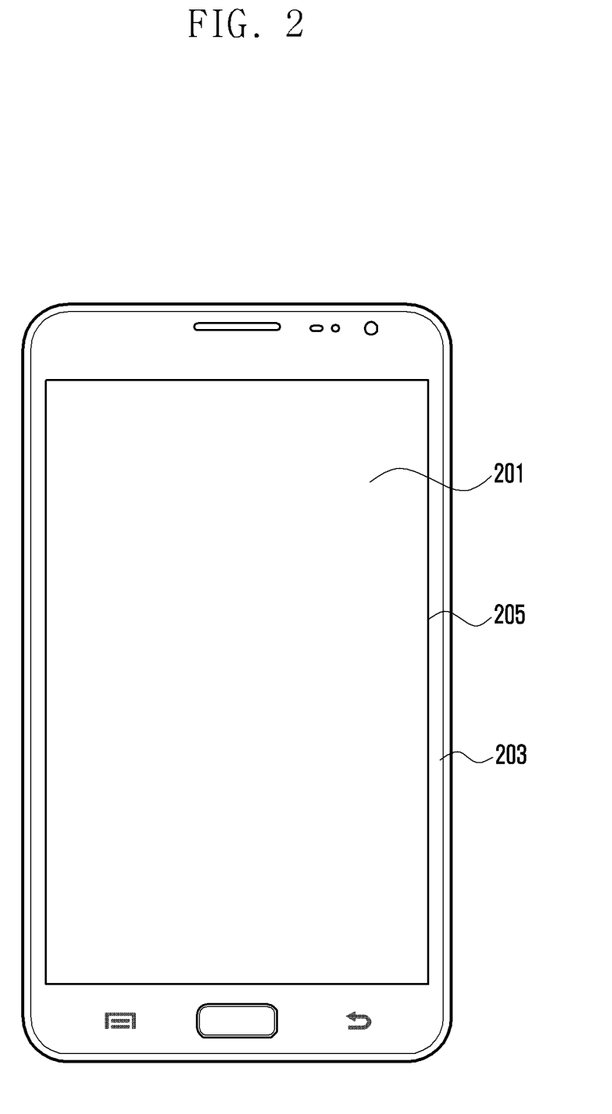
FIG. 2 is an illustration of a sensing region, a bezel region, and a boundary of an electronic device in accordance with an embodiment of the present invention.

FIG. 2 is an illustration of a sensing region, a bezel region, and a boundary of an electronic device 100 in accordance with an embodiment of the present invention.

Referring to FIGS. 1 and 2, the touch panel 132 of the electronic device 100 has a sensing region 201, a bezel region 203, and a boundary 205 between the sensing region 201 and the bezel region 203. The sensing region 201 is a part on which a screen (containing at least one object) is displayed, and the bezel region 203 is a part on which no screen is displayed. Namely, the bezel region 203 corresponds to a part that forms the outer edge of the electronic device 100.

In an embodiment of the present invention, the priority of a hovering input is determined depending on a specific region from which the hovering input is sensed. For example, if a hovering input is sensed directly from the sensing region 201, the control unit 140 recognizes the hovering input as having the first priority. If a hovering input is sensed together with a moving path passing through the boundary 205 (e.g., from the bezel region 203 to the sensing region 201), the control unit 140 recognizes the hovering input as having the second priority. If a hovering input is sensed from the boundary 205 (e.g., occurring by a user's grip), the control unit 140 recognizes the hovering input as having the third priority. In this manner, the control unit 140 is configured to determine the priorities of respective hovering inputs when two or more hovering inputs are sensed. Then, from the coordinate value of a specific hovering input having the highest priority, the control unit 140 is configured to determine the position of a hovering pointer to be displayed on the screen.

Figure 3:
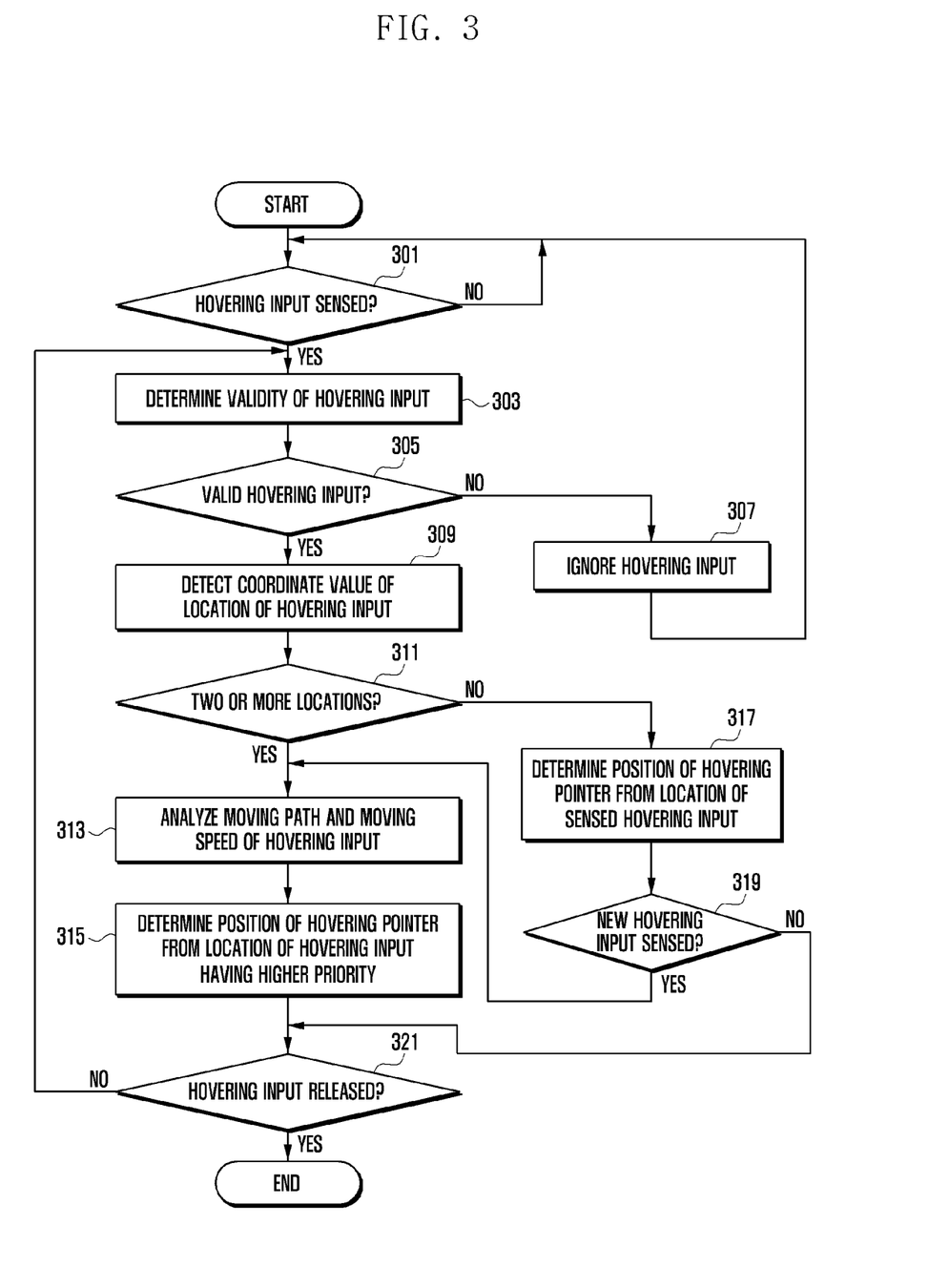
FIG. 3 is a flowchart of a method for processing a hovering input of an electronic device in accordance with an embodiment of the present invention.

FIG. 3 is a flowchart of a method of processing a hovering input of an electronic device 100 in accordance with an embodiment of the present invention.

Referring to FIG. 3, the control unit 140 is configured to control the display unit 131 to display thereon a screen containing at least one object. An object refers to a variety of elements used for forming a screen, including an icon, a thumbnail, a list, a menu, a text, a link, a popup window, or any other graphic element.

In step 301, the control unit 140 determines whether a hovering input is sensed from the screen of the display unit 131. A hovering input is sensed when an input tool (e.g., a user's hand or finger, an electronic pen, etc.) approaches the touch screen 130 within a given distance from the surface of the touch screen 130. Although the following description is based on the assumption that an input tool is a user's hand or finger, this is exemplary only and not considered as a limitation.

When a hovering input is sensed from the screen of the display unit 131, the control unit 140 determines the validity of the sensed hovering input in step 303. Namely, the control unit 140 determines whether the sensed hovering input is valid. In an embodiment of the present invention, the validity of the hovering input depends on whether a moving speed (i.e., movement) is detected from the hovering input for a given time. If a moving speed is detected from the hovering input for a given time, the control unit 140 recognizes the hovering input as a valid hovering input. In contrast, if no moving speed is detected from the hovering input for a given time, the control unit 140 recognizes the hovering input as an invalid hovering input.

The above determination based on a moving speed of a hovering input is exemplary only and not to be considered as a limitation. Meanwhile, two or more hovering inputs may be sensed at the same time or sequentially. In this case, the control unit 140 analyzes a moving path and/or moving speed of each hovering input, determines the priority of each hovering input, and further determines the position of a hovering pointer from the coordinate value of a hovering input having the highest priority.

In an embodiment of the present invention, a hovering input which starts from a specific location (e.g., a hovering input sensed directly at the sensing region of the touch panel 132) is defined as a hovering input having the first priority. Additionally, a hovering input which is entered along a specific route (e.g., a hovering input sensed as a moving path from the bezel region of the touch panel 132 to the sensing region) is defined as a hovering input having the second priority. Further, a hovering input from which no moving speed is sensed (e.g., a hovering input occurring at the boundary of the touch panel 132 by a user's grip) is defined as a hovering input having the third priority.

As a result of the determination in step 303, the control unit 140 determines at operation 305 whether the sensed hovering input is valid. If no moving speed is detected from the hovering input for a given time, the control unit 140 recognizes the hovering input as an invalid hovering input. Namely, the control unit 140 determines that no hovering input occurs, and then ignores the sensed hovering input in step 307 (i.e., no display of a hovering pointer).

In contrast, if a moving speed is detected from the hovering input for a given time, the control unit 140 recognizes the hovering input as a valid hovering input. Then, in step 309, the control unit 140 detects a coordinate value of the location from which the hovering input is sensed. Further, in step 311, the control unit 140 determines whether at least two coordinate values are detected. If at least two coordinate values are detected, the control unit 140 analyzes a moving path and/or moving speed of each hovering input in step 313. Then, based on the results, the control unit 140 determines the position of a hovering pointer from the coordinate value of a specific hovering input having the highest priority in step 315.

In contrast, if a single coordinate value is detected, namely if there is only one valid hovering input, the control unit 140 determines the position of a hovering pointer from the coordinate value of the single hovering input in step 317. Then, in step 319, the control unit 140 determines whether a new hovering input is sensed. If no new hovering input is sensed, the control unit 140 further determines, in step 321, whether the hovering input is released.

If a new hovering input is sensed, the control unit 140 analyzes, in step 313, a moving path and/or moving speed of each of the existing hovering input and the new hovering input, and, in step 315, determines the position of a hovering pointer from the coordinate value of a specific hovering input having the highest priority. Namely, if a new hovering input has a higher priority, the control unit 140 determines the position of a hovering pointer from the new hovering input. In contrast, if the existing hovering input has a higher priority, the control unit 140 maintains the current position of a hovering pointer.

In step 321, the control unit 140 determines whether the hovering input is released. If no hovering input signal is received from the touch panel 132, the control unit 140 determines that the hovering input is released. If the hovering input is not released, the control unit 140 returns to step 303 discussed above.

Now, the above-discussed method of processing a hovering input will be described through examples in FIGS. 4A-4C.

Figure 4A:
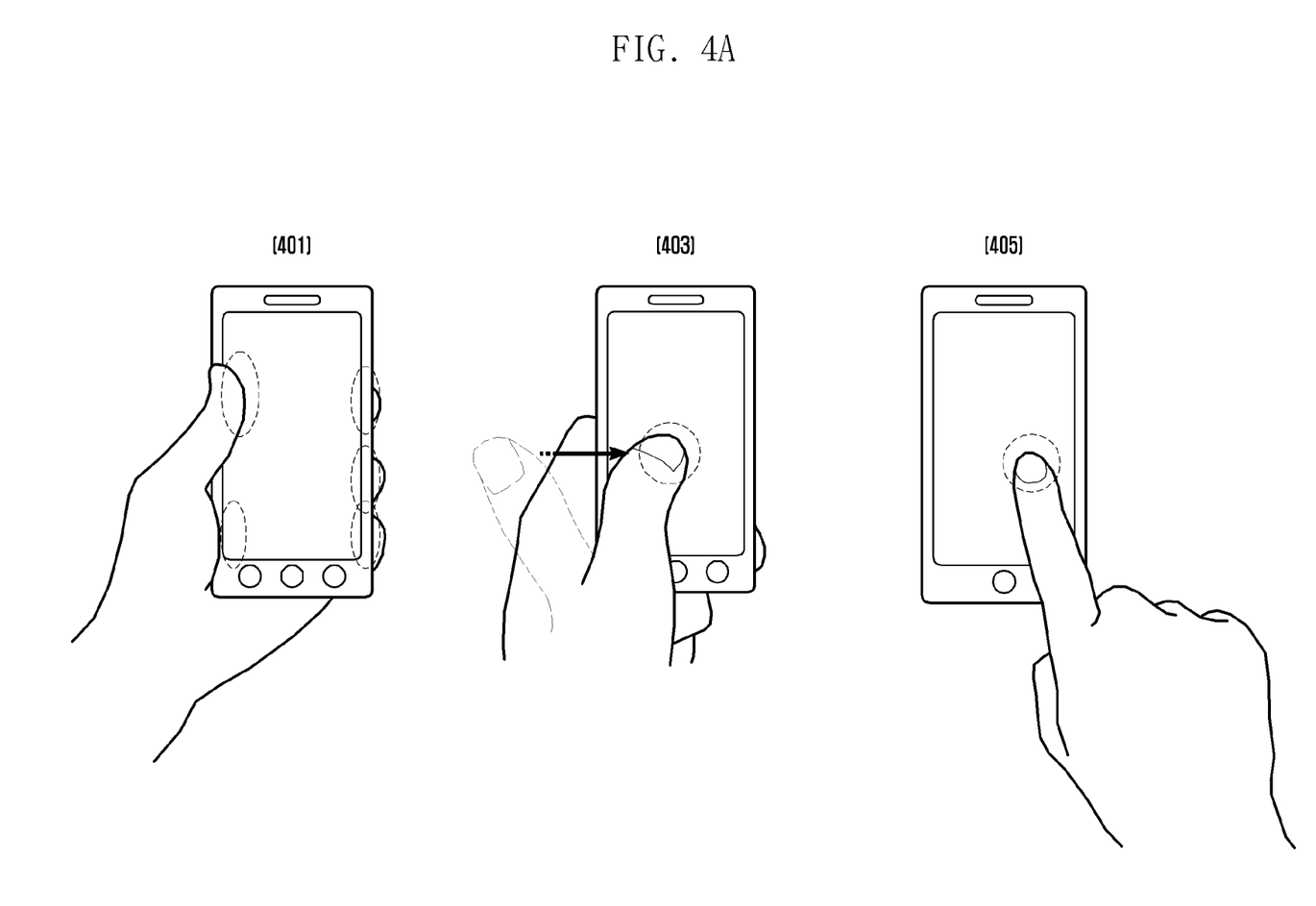
FIGS. 4A, 4B and 4C are illustrations of a method of processing a hovering input of an electronic device in accordance with an embodiment of the present invention.
Figure 4B:
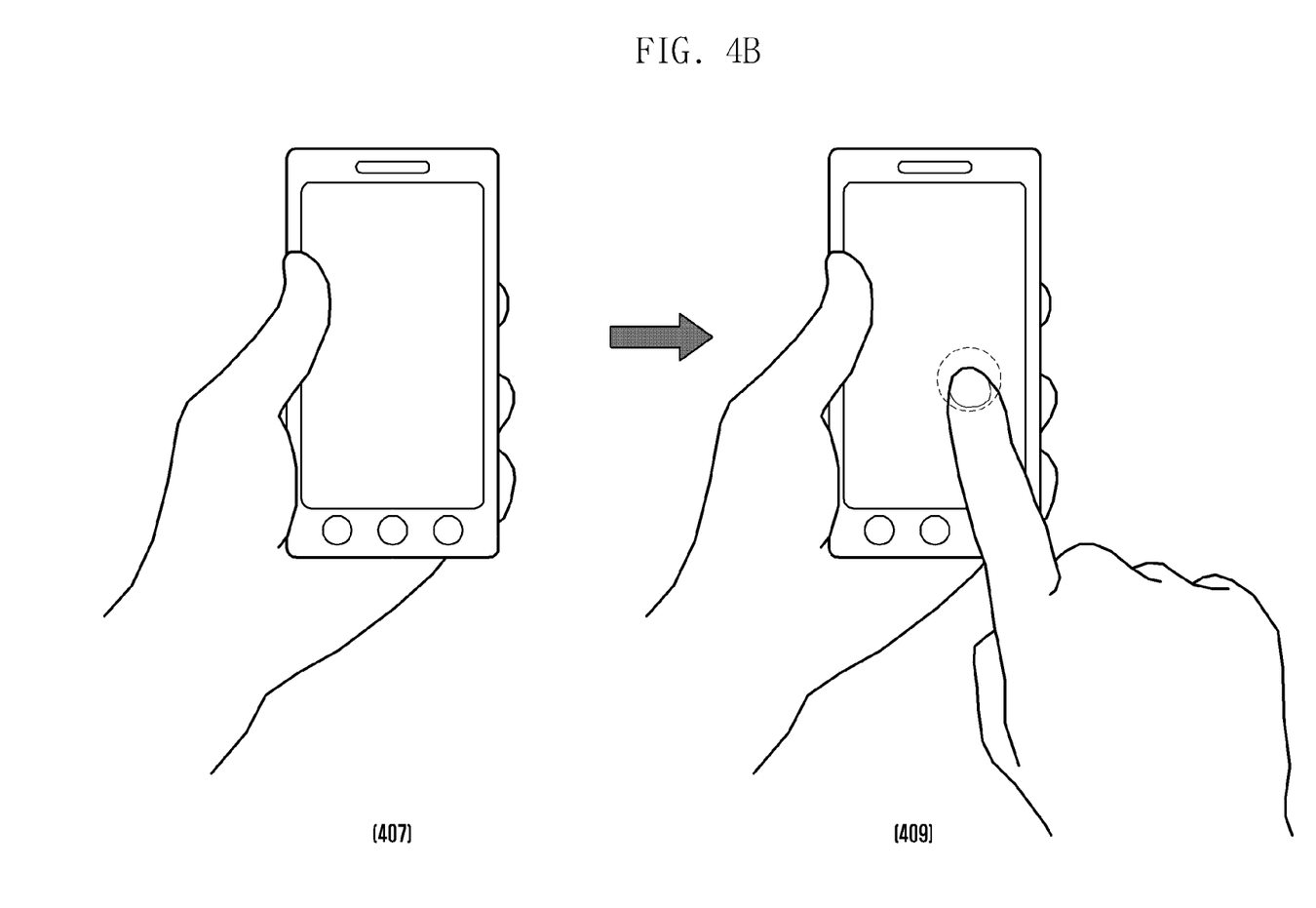
Figure 4C:
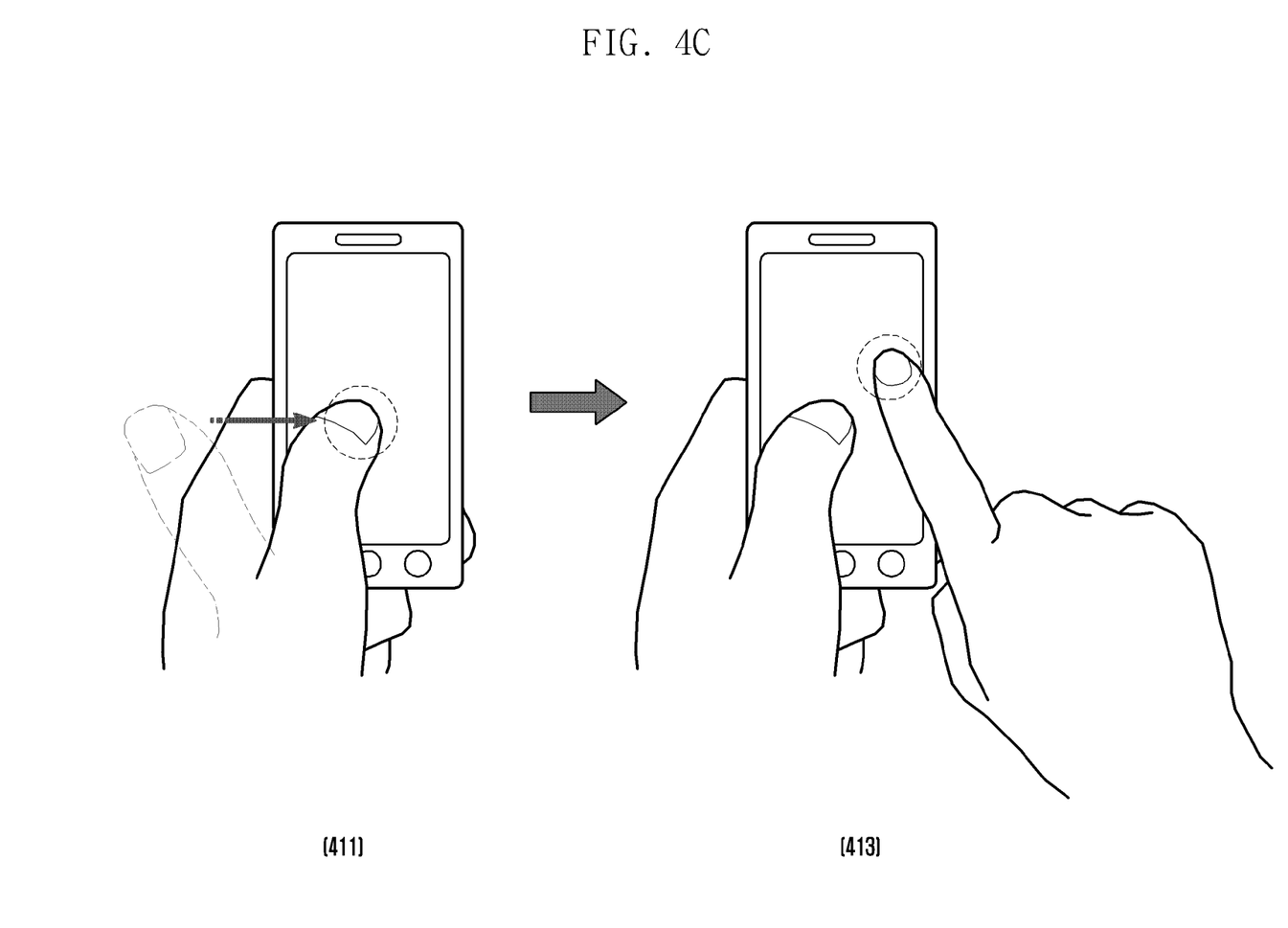

FIGS. 4A, 4B and 4C are illustrations of a method of processing a hovering input of an electronic device in accordance with an embodiment of the present invention.

As discussed above, in an embodiment of the present invention, the control unit 140 senses two or more hovering inputs. Then, the control unit 140 analyzes a moving path and/or moving speed of each hovering input and determines the priority of each hovering input. Further, the control unit 140 determines the position of a hovering pointer from the coordinate value of a specific hovering input having the highest priority. Even though embodiments of the present invention are based on the assumption that hovering inputs are processed using three priorities, this is exemplary only and not to be considered as a limitation.

In the following embodiment of the present invention, it is supposed that a hovering input having the first priority is the third hovering input, a hovering input having the second priority is the second hovering input, and a hovering input having the third priority is the first hovering input.

As shown in scene 401 of FIG. 4A, the control unit 140 senses a hovering input by a user's hand gripping the electronic device 100. Depending on whether the sensed hovering input is moved for a given time, the control unit 140 determines whether the hovering input is valid. If there is no movement of the hovering input for a given time, the control unit 140 ignores the sensed hovering input. Namely, a hovering input which occurs at a boundary of the touch panel 132 by a user's grip is defined as the first hovering input, which has the lowest priority (i.e., the third priority). The first hovering input having no movement is recognized as an invalid hovering input and ignored (i.e., no hovering pointer is displayed).

As shown in scene 403 of FIG. 4A, if a hovering input is sensed along a moving path from the bezel region to the sensing region of the touch panel 132 (i.e., a path passing through the boundary of the touch panel 132), this hovering input is defined as the second hovering input, which has an intermediate priority (i.e., the second priority). For example, the second hovering input may be caused by an inward movement of the thumb of a user's hand gripping the electronic device. Namely, the thumb may move from the outside of the touch panel 132 to the inside.

The priority may not be fixed. Namely, depending on a moving path and/or moving speed of the hovering input and/or the addition of a new hovering input, the priority may be varied even though being determined previously. For example, if a moving speed is not detected from the second hovering input having the second priority for a given time, the control unit 140 changes the priority of the second hovering input from the second priority to the third priority.

As shown in scene 405 of FIG. 4A, if a moving path of a hovering input starts from a specific location (e.g., a hovering input directly sensed from the sensing region of the touch panel 132), or if such a moving path is different from a path of the second hovering input shown in scene 403, this hovering input is defined as the third hovering input, which has the highest priority (i.e., the first priority). For example, the third hovering input may be caused by a user's non-gripping hand or another user's hand. The third hovering input may occur by a user's intention and hence start directly from a specific location rather than being entered along a certain route. Therefore, the third hovering input having the first priority may have priority over any other hovering input having the second or third priority. If the third hovering input having the first priority is not sensed, a hovering pointer is displayed using the next priority (i.e., the second priority). As discussed above, the priority is not fixed and varies depending on a moving path and/or moving speed of the hovering input and/or the addition of a new hovering input even though being determined previously.

In an embodiment of the present invention, it is assumed that two hovering inputs (e.g., the first and third hovering inputs) are sensed.

For example, the third hovering input may be sensed while the first hovering input is maintained. Alternatively, the first hovering input may be sensed while the third hovering input is maintained.

FIG. 4B shows the former case. Namely, after the first hovering input occurs as shown in scene 407, the third hovering input is sensed as shown in scene 409. As discussed above, the control unit 140 determines, based on a moving speed of a hovering input, whether each hovering input is valid. Since no moving speed is sensed, the first hovering input is recognized as an invalid hovering input and ignored. Thereafter, if the third hovering input having a moving speed is sensed, this is recognized as a valid hovering input and then the location thereof is detected. Since the coordinate value of the third hovering input only is detected, the coordinate value of the third hovering input is determined as the position of a hovering pointer.

In an embodiment of the present invention, after the third hovering input occurs as shown in scene 409, the first hovering input is sensed as shown in scene 407. Like the above case, the control unit 140 determines, based on a moving speed of a hovering input, whether each hovering input is valid. Since a moving speed is sensed from the third hovering input as discussed above, the third hovering input is recognized as being valid and then the location thereof is detected. Since only the coordinate value of the third hovering input is detected, the coordinate value of the third hovering input is determined as the position of a hovering pointer. Thereafter, the first hovering input is sensed. Then, the control unit 140 checks the priority of the first hovering input by analyzing a moving path and/or moving speed of the first hovering input. Further, the control unit 140 compares the priority of the first hovering input with that of the third hovering input and then determines the position of a hovering pointer from the location of a hovering input having the higher priority. Since the first hovering input occurs at the boundary of the touch panel 132, no moving speed is sensed. Therefore, the first hovering input is ignored and hence the hovering pointer is continuously displayed at the location of the third hovering input. Meanwhile, if there is no movement of the third hovering input, the third hovering input is ignored.

In an embodiment of the present invention, it is supposed, as shown in FIG. 4C, that the third hovering input is sensed after the second hovering input occurs.

As shown in scene 411 of FIG. 4C, the control unit 140 senses the second hovering input through the touch panel 132. Then, the control unit 140 determines the validity of the second hovering input, based on a moving speed thereof. Since a moving speed is sensed from the second hovering input as discussed above, the second hovering input is recognized as being valid and then the location thereof is detected. Since only the coordinate value of the second hovering input is detected, the coordinate value of second hovering input is determined as the position of a hovering pointer. Thereafter, as shown in scene 413 of FIG. 4C, the control unit 140 senses the third hovering input through the touch panel 132. Then, the control unit 140 determines a hovering input having the higher priority by analyzing a moving path and/or moving speed of each of the second and third hovering inputs. Since the second hovering input has the second priority and the third hovering input has the first priority, the position of a hovering pointer is determined from the location of the third hovering input having the higher priority. Therefore, the position of a current hovering pointer is changed from the location of the second hovering input to that of the third hovering input.

As fully discussed hereinbefore, even though two or more hovering inputs are sensed at the same time, the electronic device displays the hovering pointer at an exact position desired by a user.

While the present invention has been shown and described with reference to an embodiment thereof, it will be understood by those skilled in the art that various changes in form and details may be made therein without departing from the spirit and scope of the present invention as defined by the appended claims and their equivalents.

What is claimed is:

1. A method of processing an input of an electronic device, comprising:
    displaying a screen;
    when at least two hovering inputs are sensed, analyzing a priority of the at least two hovering inputs based on a moving path of the at least two hovering inputs; and
    determining a position of a hovering pointer from a location of a hovering input having a highest priority among the at least two hovering inputs.

2. The method of claim 1, wherein analyzing the priority of the at least two hovering inputs comprises:
    if a hovering input is sensed from a sensing region of a touch panel, recognizing the sensed hovering input as having a first priority; and
    if the hovering input having the moving path from a bezel region of the touch panel to the sensing region is sensed, recognizing the sensed hovering input as having a second priority.

3. The method of claim 2, wherein determining the position of the hovering pointer further comprises:

if the hovering input is sensed from a boundary of the touch panel, recognizing the sensed hovering input as having a third priority.

4. The method of claim 3, further comprising:
changing the priority of the hovering input for which a priority was determined if no moving speed is sensed from the hovering input for a given time or if the moving path is varied.

5. The method of claim 1, further comprising:
when one hovering input is sensed, determining the position of the hovering pointer from the detected location of the one hovering input.

6. The method of claim 5, wherein determining the position of the hovering pointer further comprises:
when a new hovering input is sensed, analyzing a priority of the new hovering input and the priority of the hovering input that exists; and
determining the position of the hovering pointer from a location of the hovering input having the highest priority.

7. The method of claim 1, further comprising:
if a moving speed is detected from the hovering input corresponding to the determined hovering pointer for a given time, recognizing the hovering input as being valid.

8. The method of claim 7, further comprising:
if no moving speed is detected from the hovering input corresponding to the determined hovering pointer for a given time, ignoring the hovering input.

9. An electronic device, comprising:
a display unit configured to display a screen;
a touch panel configured to sense a hovering input; and
a control unit configured, when at least two hovering inputs are sensed from the touch panel, to analyze a priority of the at least two hovering inputs based on a moving path of the at least two hovering inputs, and to determine a position of a hovering pointer from a location of a hovering input having a highest priority among the at least two hovering inputs.

10. The electronic device of claim 9, wherein the control unit is further configured to recognize the sensed hovering input as having a first priority if the hovering input is sensed from a sensing region of the touch panel, recognize the sensed hovering input as having a second priority if the hovering input having the moving path from a bezel region of the touch panel to the sensing region is sensed, and recognize the sensed hovering input as having a third priority if the hovering input is sensed from a boundary of the touch panel.

11. The electronic device of claim 10, wherein the control unit is further configured to change the priority of the hovering input if no moving speed is sensed from the hovering input for a given time after the priority was previously determined or if the moving path is varied.

12. The electronic device of claim 9, wherein the control unit is further configured, when one hovering input is sensed, to determine the position of the hovering pointer from the detected location of the one hovering input.

13. The electronic device of claim 12, wherein the control unit is further configured, when a new hovering input is sensed, to analyze a priority of the new hovering input and the priority of the hovering input that exists, and to determine the position of the hovering pointer from a location of the hovering input having the highest priority.

14. The electronic device of claim 9, wherein the control unit is further configured, if a moving speed is detected from the hovering input corresponding to the determined hovering pointer for a given time, to recognize the hovering input as being valid.

15. The electronic device of claim 14, wherein the control unit is further configured, if no moving speed is detected from the hovering input corresponding to the determined hovering pointer for a given time, to ignore the hovering input.

* * * * *